United States Patent

Edlinger et al.

[11] Patent Number: 5,882,375
[45] Date of Patent: Mar. 16, 1999

[54] PROCESS FOR THE PRODUCTION OF HYDRAULIC BINDERS AND/OR ALLOYS, SUCH AS FOR EXAMPLES, FERROCHROMIUM OR FERROVANADIUM

[75] Inventors: Alfred Edlinger, Baden, Switzerland; Andreas Goessnitzer, Leoben, Austria

[73] Assignee: "Holderbank" Financiere Glarus AG, Glarus, Switzerland

[21] Appl. No.: 765,357
[22] PCT Filed: May 30, 1996
[86] PCT No.: PCT/AT96/00085
 § 371 Date: Dec. 31, 1996
 § 102(e) Date: Dec. 31, 1996
[87] PCT Pub. No.: WO96/34989
 PCT Pub. Date: Nov. 7, 1996

[30] Foreign Application Priority Data

May 2, 1995 [AT] Austria ..................................... 244/95

[51] Int. Cl.⁶ ................................. C21B 3/08; C04B 5/06
[52] U.S. Cl. .......................... 75/10.35; 75/10.63; 75/434; 75/622; 75/623; 106/714; 106/789
[58] Field of Search ................................ 75/10.35, 10.63, 75/434, 622, 623; 106/714, 789

[56] References Cited

U.S. PATENT DOCUMENTS

| 2,104,890 | 1/1938 | Wark. | |
|---|---|---|---|
| 3,579,328 | 5/1971 | Svelgen et al. | 75/10.35 |
| 5,405,429 | 4/1995 | Rey et al. | 75/434 |

FOREIGN PATENT DOCUMENTS

| 707 083 | 4/1996 | European Pat. Off. | |
|---|---|---|---|
| 714 860 | 6/1996 | European Pat. Off. | |
| 710 753 | 3/1937 | Germany. | |
| 88 1143 | 11/1981 | U.S.S.R. | 75/622 |
| 94/17214 | 8/1994 | WIPO. | |
| 96/07365 | 3/1995 | WIPO. | |
| 96/10097 | 4/1996 | WIPO. | |

OTHER PUBLICATIONS

Ullmanns Encyklopadie der technischen Chemie, 4. Auflage, Band 23, Weinheim, Verlag Chemie 1983, Seiten 495 bis 500, insbesondere Kapitel 3.1 4.2. month unavailable.

Primary Examiner—Melvyn Andrews
Attorney, Agent, or Firm—Pillsbury Madison & Sutro LLP

[57] ABSTRACT

In a process for the production of hydraulic binders, crude steel and/or alloys, such as, e.g., FeCr or FeV, from basic steel slags containing chromium and/or vanadium, the liquid steel slag is mixed with an additive selected from the group consisting of blast furnace slag, electric arc furnace slag, dusts from steel production, metallic waste substances or refuse incineration residues and/or with acid additives for lowering the viscosity, whereupon steel is sedimented out of the liquid slag and the remaining slag in a first reduction stage is reduced to metallic iron having an iron oxide content of below 5 wt. % and above 1 wt. %, whereupon the remaining slag melt in a second reduction stage having a higher reduction potential as compared to the first reduction stage is further reduced to metallic Cr or V or ferroalloys thereof and the hydraulically active slag is separated.

26 Claims, 2 Drawing Sheets

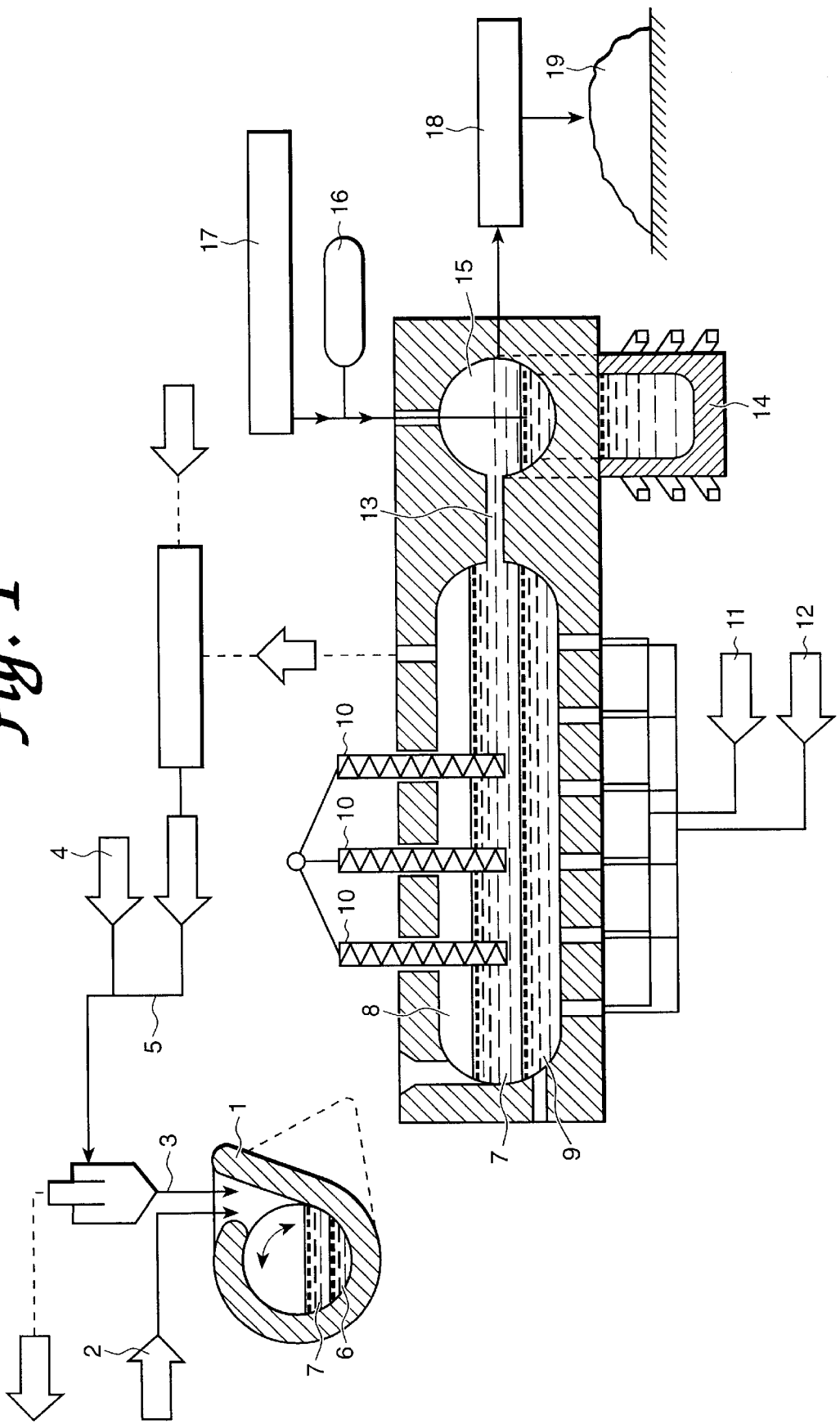

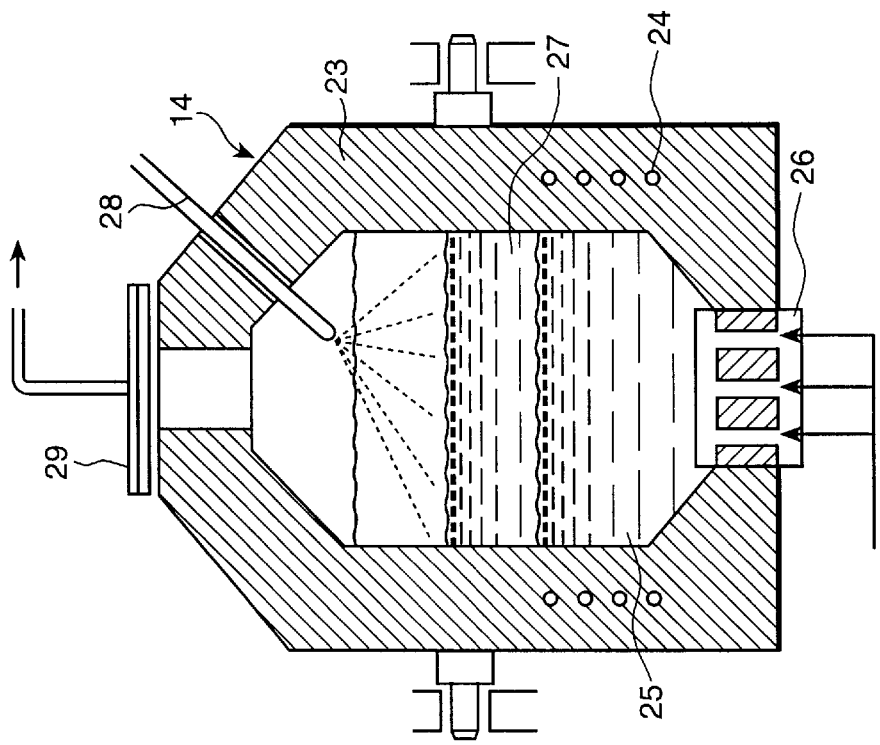
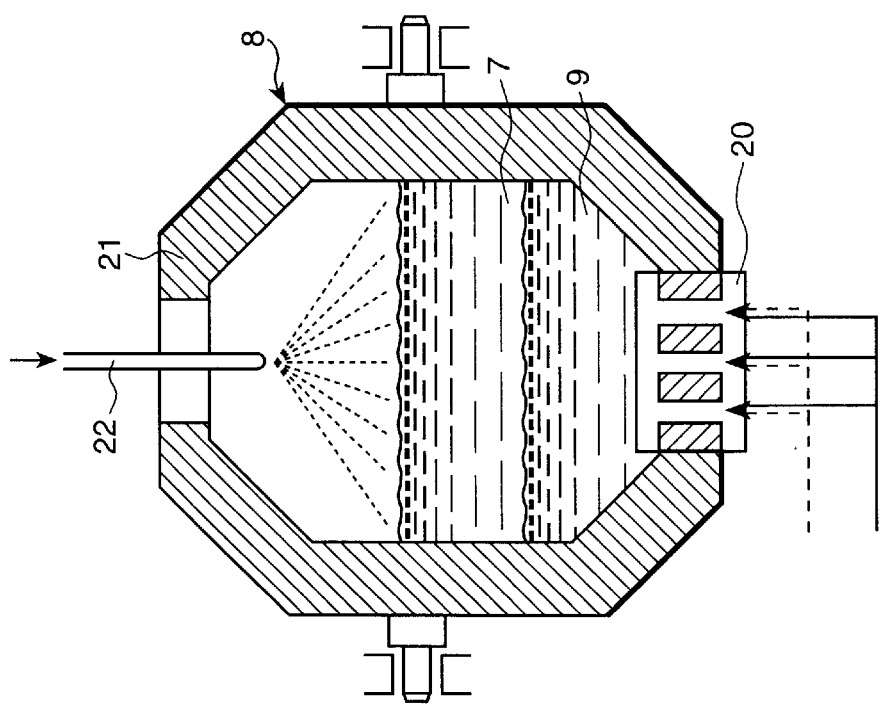

PROCESS FOR THE PRODUCTION OF HYDRAULIC BINDERS AND/OR ALLOYS, SUCH AS FOR EXAMPLES, FERROCHROMIUM OR FERROVANADIUM

This application is the national phase of international application PCT/ AT96/00085 filed Apr. 30, 1996 which designated the U.S.

BACKGROUND OF THE INVENTION

1. Field of Invention

The invention relates to a process for the production of hydraulic binders, crude steel and/or alloys, such as, e.g., FeCr or FeV, from basic steel slags containing chromium and/or vanadium.

2. Description of Related Art

For producing cement clinker and special binder qualities having high α-belite contents and high ultimate strengths from metallurgical slags it has already been proposed to mix together liquid slags from reduction processes and from steelworks processes and, if required, add lime thereto. When mixing acid liquid slags as they incur, for instance, in blast furnace processes and basic steelworks slags as they incur, for instance, in the form of converter slags, heat is released since this is an exothermic neutralization reaction.

As a rule, a relatively high portion of blast furnace slag has been required for the production of hydraulic binders. Besides classical portland cement, such blast furnace slags have gained great importance as slag cements. Slag cements in the narrower sense are finely ground mixtures of gypsum, clinker and blast furnace slag, a slight amount of gypsum usually having been added for controlling the setting time, as is the case with portland cement.

The usability of basic slags as they incur from steelworks processes, for instance as LD slags, in most cases is substantially limited. The disposal of electric arc furnace slags, like that of steel slags, involves relatively high expenditures. At present, steelworks slags and electric arc furnace slags are, for instance, recycled into the blast furnace, the remainder being used in road construction or dumped. However, due to increasing scrap charge quotas, the contents of heavy metals and, in particular, the contents of chromium and vanadium in steel slags and electric arc furnace slags has constantly increased such that simple dumping no longer appears admissible with the concentration of such heavy metals rising. In the future, such slags presumably will have to be dumped on dumping grounds for special waste, the operation of which involves considerable costs.

Steel slag stands out for its relatively high iron oxide content brought about by the refining process. Usual steel slag contains manganese oxide and iron oxide to an extent that may amount up to 33 wt. %. Blast furnace slag stands out for its relatively favorable hydraulic properties. Morever, blast furnace slag has a substantially lower iron oxide content, its processing to basic construction material thus being considerably facilitated.

Binder additives influencing the setting time, the fatigue strength and other parameters essential to binders have gained more and more importance in the production of hydraulic binders. Such additives may be used in connection with conventional hydraulic binders, such as, for instance, slag cement or portland cement, for adjusting the desired properties.

SUMMARY OF THE INVENTION

The invention aims at providing, above all, a further economic way of aftertreating and processing steel slags—dumping of which involves a number of problems—, by which hydraulic binders and crude steel or alloys can be directly obtained from steel slag. The invention, in particular, aims at recovering chromium and vanadium in high purities from basic steel slags without having to carry out cumbersome roasting and leaching processes, while simultaneously being able to quantitatively purify the original chromium- and vanadium-containing slag from metals, such as e.g. manganese so as to obtain an extremely pure slag which in the following may be worked up, for instance, to hydraulically active binders or binder additives. To solve this object, the mode of procedure according to the invention substantially consists in that the liquid steel slag is mixed with an additive selected from the group consisting of blast furnace slag, electric arc furnace slag, dusts from steel production, metallic waste substances or refuse incineration residues and/or with acid additives for lowering the viscosity, whereupon steel is sedimented out of the liquid slag and the remaining slag in a first reduction stage is reduced to metallic iron having an iron oxide content of below 5 wt. % and above 1 wt. %, whereupon the remaining slag melt in a second reduction stage having a higher reduction potential as compared to the first reduction stage is further reduced to metallic Cr or V or ferroalloys thereof and the hydraulically active slag is separated.

By the fact that liquid steel slag is used, the latent heat of the steel slag after the refining process is utilized to the major extent on the one hand, and by the fact that additives selected from the group consisting of blast furnace slag, electric arc furnace slag, dusts from steel production, metallic waste substances or refuse incineration residues are added, a mixed slag is produced on the whole, which can be further treated in a particularly simple manner so as to form a slag that stands out for its good hydraulic properties while simultaneously recovering a metal bath. When mixing liquid steel slags with the additives mentioned, at first an increase in temperature is brought about by the exothermic slag raction caused by the redox processes and the acid/base neutralization such that any additional energy input may be minimized. At the same time, the melt viscosity markedly drops as compared to that of the starting slags. Since liquid steel slag has a relatively high content of steel, which is present in the steel slag in the dispersed form, rapid sedimentation of this steel portion can be ensured at the simultaneous marked decrease of the melt viscosity of the slag such that a first separation of steel upon sedimentation may be effected immediately after mixing of the liquid steel slag with the additives mentioned. Due to the fact that the remaining slag mixture is introduced into a reduction reactor under the addition of coal or coke, it has become feasible to accordingly lower the relatively high iron oxide content caused by the steel slag, and due to the fact that according to the invention a decrease to below 5 wt. % occurs, with a minimum iron oxide content of 1 wt. % being maintained, it is ensured that nobler metals, such as, e.g., chromium and vanadium remain within the slag, being separable in a consecutively provided second reduction stage quantitatively and at elevated purities. By the fact that the remaining slag melt is reduced in a second reduction stage having a higher reduction potential as compared to the first reduction stage, it is feasible to selectively reduce vanadium and optionally chromium, thus obtaining a hydraulically active slag exhibiting an extremely high purity. Two-stage process control allows for the quantitative separation to a major extent already in the first reduction stage, of the major portion of metals that would render the subsequent recovery of chromium and vanadium more difficult. It is only in the second reduction stage offering an accordingly higher reduction potential that vanadium and/or chromium are directly recovered in metallic forms or in the form of ferrovanadium or ferrochromium, respectively.

In order to keep chromium and vanadium safely within the slag, the process advantageously is realized in a manner that the iron oxide content of the slag in the first reduction stage is maintained to be higher than 2 wt. %.

In a particularly advantageous manner, the process according to the invention is carried out in that the slag mixture in the reduction reactor is reduced at temperatures of from 1400° C. to 1550° C., in particular at 1450° C., for at least 30 minutes, preferably one hour. At the cited temperatures prevailing within the reduction reactor, the desired separation of heavy metals is feasible in a quantitative manner, a particularly pure final slag being formed. To lower the viscosity of the slag, it may advantageously be proceeded in a manner that $SiO_2$- and/or $Al_2O_3$-containing additives, such as, e.g., sand, bauxite or marl are employed as acid additives. In the first reduction stage carbon carriers, such as, e.g., coke, coal or synthesis gas, may be added, the first reduction advantageously being conducted above an iron bath. Thus, an accordingly mild reduction is ensured in the first reduction stage, the premature reduction of chromium and vanadium as well as optionally further, accordingly less noble metals being prevented. By the fact that pig iron is simultaneously formed already in a first reduction procedure, the slag in a first reduction reactor of this type is in equilibrium with the metal bath and in equilibrium with the reducing agents, any additional energy input being reducible to a minimum on account of the reduction procedures occurring. At temperatures of between 1400° and 1600° C. the pig iron formed, or the alloy formed, is readily separable from the hydraulically active slag formed, simple further processing being feasible. Any additional energy input in the first stage may be realized in a simple manner by blowing oxygen through the iron bath and/or onto the slag bath, said oxygen being applicable in the form of atmospheric oxygen. By blowing onto the slag bath, carbon monoxide formed is burnt, thus making available additional thermal energy.

The reduction under more strongly reducing conditions advantageously is carried out in that the second reduction is realized while adding Ca, Al, Si and Fe as reducing agents, the reducing agents for the second reduction preferably being dosed into an iron bath. When using an iron bath for the second reduction, a concentration of vanadium in the iron bath of at least 40% may be obtained. The concentration of vanadium may amount up to 80 wt. %, the ferrovanadium obtained being characterized by extremely low carbon contents and largely free of manganese and chromium. If excess reduction material (Ca, Al, Si) is still dissolved in the ferrovanadium obtained, this may quite readily be refined out and slagged in a highly selective manner by aid of $V_2O_5$ or $V_2O_5$-containing substances.

To prevent the reducing agents from being unnecessarily burnt, the second reduction advantageously is effected under an atmosphere at least partially rendered inert. Inerting may be obtained by using a nitrogen or argon atmosphere, wherein $N_2$ cannot be used as an inert gas when using Al as a reductant because of the formation of aluminum nitride. Calcium may be added in the form of calcium wire, the reducing agents being chargeable together, sequentially or separately. The vanadium-free slag melt obtained advantageously may then be granulated with water and worked up to hydraulically active binders or binder additives. The active binders or binder additives obtained stand out for their extremely high purities as compared to other metallurgical cements.

To enhance the heat balance of the process, it is advantageously proceeded in a manner that the acid additives are introduced into the liquid slag in a preheated state. When using solid carbon carriers, carbon monoxide will be formed in the first place during the first reduction procedure, which may subsequently be afterburnt and used for preheating the additives. When using natural gas or synthesis gas, also hydrogen will be formed from hydrocarbon, this hydrogen being active as an additional reducing agent. Remaining hydrogen likewise may be burnt in the following and used for preheating additives. The carbon dissolved in the iron bath during said first reduction process induces a reduction at the interface between iron bath and slag melt, whereas the gaseous components hydrogen and carbon monoxide ensure the reduction of the slag by developing gas bubbles within the iron bath, which will bubble up through the liquid slag.

To safeguard the respective viscosity required for the passage of gaseous reducing agents, it is advantageously proceeded in a manner that the second reduction stage is operated by electric heating.

The chromium- and/or vanadium-free slag may readily be granulated with water and worked up into hydraulically active binders or binder additives, an extremely pure slag being available as a starting material in that case.

On the whole, the respective process temperature required for each of the reduction stages in that case may be controlled in a particularly simple manner. The electric heating means for the second reduction stage may be operated by simple conventional control means, whereas the appropriate temperature in the first reduction stage may be maintained by selectively dosing in oxygen. The metal bath substantially saturated with carbon in the first reduction stage causes the gasification of carbon as oxygen is conducted therethrough, thus forming carbon monoxide, which may be drawn off the reduction reactor at an accordingly high temperature and used in the process in an energy-supplying manner.

Advantageously, it may, however, also be proceeded within the scope of the present invention in that quartz sand is added to the floating slag bath present in the reduction reactor and the metal bath is refined to steel. By adding quartz sand, the slag layer may be adjusted to be substantially acid and the pig iron bath may be refined to chromium-free pig iron in a particularly simple manner. In that case a portion of the carbon is gasified to carbon monoxide, the heavy metals vanadium, manganese and chromium forming into slags with oxygen. From such a refining procedure pig iron substantially free of heavy metals as well as concentrated slag material result, from which latter chromium and/or vanadium may be recovered in a particularly simple manner. Therefore, the process according to the invention advantageously is realized in that the reduction reactor is operated until the slag amount has reached 10 wt. % to 20 wt. %, based on the metal bath, whereupon the pig iron is refined to steel and Cr, V and other alloying elements are slagged, the chromium slag formed advantageously being used for the production of ferrochromium.

In such a refining procedure, also phosphorus and, after refining, sulfur may, of course, be eliminated in a simple manner.

To prevent overheating in the refining process, the refining bath advantageously may be cooled by adding scrap or iron carbide.

Advantageously, liquid steel slag is used in an amount ranging between 50 and 70 wt. % of the slag mixture, from which it can be seen that relatively large portions of hitherto hardly processable steelworks slag may be subjected to economic treatment in such a way. To accordingly reduce the energy input, the charging substances for the slag mixture advantageously are mixed with one another in the liquid state and are mixed in a tiltable converter, wherein the slag mixture formed and the sedimented crude steel bath can be poured off separately by decanting when using such a tiltable converter.

BRIEF DESCRIPTION OF THE DRAWINGS

The invention now will be described in greater detail with respect to the accompanying drawings, wherein:

FIG. 1 schematically represents apparatus for carrying out the process of the present invention;

FIG. 2 is a modified configuration of a reduction reactor for the first reduction stage of the process; and FIG. 3 is a modified configuration of a reduction reactor for the second reduction stage of the process.

DETAILED DESCRIPTION OF PREFERRED EMBODIMENTS OF THE INVENTION

The invention now will be explained in more detail by way of exemplary embodiments. In respect of the chemical analyses used below, the following should be noted:

The analysis values for Fe in the slags usually are indicated as $Fe_2O_3$. However, in reality the iron dissolved in the slag predominantly is present in the bivalent form. The same holds for managenese. Also sulfur predominantly is present in the sulfidic form, yet in the analyses is referred to as. "$SO_3$". Cr and V very rapidly change their valency stages. Thus, V is present in the following stages: +5/+4/+3/+2. For the sake of simplicity, V is referred to as $V_2O_5$. For, the analytic differentiation of the individual valency stages is very difficult.

EXAMPLE 1

The slag used typically corresponded to the following analysis:

| Component | Portion % |
|---|---|
| $SiO_2$ | 8.8 |
| $Al_2O_3$ | 1.5 |
| $Fe_2O_3$ | 31.4 |
| CaO | 33.3 |
| MgO | 3.3 |
| $SO_3$ | 0.36 |
| $K_2O$ | 0.15 |
| $Na_2O$ | 0.08 |
| $TiO_2$ | 9.7 |
| $Cr_2O_3$ (Cr) | 0.13 (0.092) |
| $Mn_2O_3$ | 3.16 |
| $P_2O_5$ | 1.7 |
| $V_2O_5$ (V) | 4.3 (2.9) |
| Total | 98.32 |

1 ton of this slag still contains about 112 kg crude steel dispersed in the form of droplets (droplet diameter about 2 to 8 mm).

To 1 ton LDS 220 kg sand (98% $SiO_2$) were added such that the following mixed slag composition (1220 kg) resulted.

| Component | Portion % |
|---|---|
| $SiO_2$ | 22 |
| $Al_2O_3$ | 1 |
| $Fe_2O_3$ | 26 |
| CaO | 28 |
| MgO | 2.7 |
| $SO_3$ | 0.3 |
| $K_2O$ | 0.1 |
| $Na_2O$ | 0.1 |
| $TiO_2$ | 8.1 |
| $Cr_2O_3$ (Cr) | 0.11 (0.08) |
| $Mn_2O_3$ | 3 |
| $P_2O_5$ | 1.4 |
| $V_2O_5$ (V) | 3.6 (2.4) |

The dispersed crude steel sedimented out of this mixed slag at 1630°. Since the slag melt has a very low viscosity already at 1400°, "frozen" steel droplets likewise can sediment out at this temperature. This mode of procedure may be of great advantage, the refractory material being substantially less strongly acted upon by the reduced temperature. The mixed slag formed was then reduced in the iron bath in a manner that the "reduced" oxides of iron, phosphorus, chromium and manganese sedimented into the iron bath.

The remaining reduced mixed slag had the following composition:

| Component | Portion % |
|---|---|
| $SiO_2$ | 32 |
| $Al_2O_3$ | 1.5 |
| $Fe_2O_3$ | — |
| CaO | 41 |
| MgO | 4 |
| $SO_3$ | 0.4 |
| $K_2O$ | 0.15 |
| $Na_2O$ | 0.15 |
| $TiO_2$ | 11.8 |
| $Cr_2O_3$ (Cr) | — |
| $Mn_2O_3$ | — |
| $P_2O_5$ | — |
| $V_2O_5$ (V) | 5.25 (3.5) |
| $CaO/SiO_2$ | 1.28 |

After this reduction stage all of V was present practically in the +2 valency stage.

The corresponding metal regulus ("pig iron") had the following composition:

| Component | Portion % |
|---|---|
| P | 3.1 |
| Cr | 0.4 |
| Mn | 10.3 |
| Fe | 85.4 |

The reduced slag thus formed was supplied to a vanadium reactor schematically represented in the drawing.

In FIG. 1, 1 serves to denote a mixer, into which the molten slag schematically indicated by 2 was charged and mixed with acid additives via a duct 3 for lowering the viscosity. The acid additives, such as, for instance, sand 4 were preheated along with hot gas fed through duct 5, prior to reaching the mixer. In the mixer sedimentation was effected at the same time, the mixed slag 7 freed from steel floating on a crude steel bath 6. After this, the mixed slag 7 was introduced into a first reduction stage 8 comprised of an iron bath reactor. The iron bath is denoted by 9, the mixed slag 7 being applied onto this iron bath in a floating manner.

The iron bath is heated by means of bath electrodes 10. Natural gas 11 and/or combustion oxygen 12 are fed through ducts as reducing agents, wherein the reactor is configured as a bottom-blowing reactor and the combustion products, such as, for instance, hydrogen and carbon monoxide, pass through the iron bath, effecting a reduction of the iron and optionally of manganese and chromium within the slag.

The iron-free mixed slag through a channel 13 reaches the second reduction stage. The second reactor is heated inductively, wherein the high-frequency heating current may be superimposed by a medium-frequency field, thereby being able to inductively agitate the iron bath. As an additional agitating means, nitrogen or argon may be flushed in via injection nozzles, a protective gas atmosphere 15 being formed above the slag bath. The reaction kinetics may be substantially enhanced by the agitation effect obtained within the reactor such that the complete reduction of the vanadium oxides is feasible. In the embodiment schematically illustrated in the drawing, a calcium wire 16 is used as a reducing medium, said calcium wire being introduced into the iron bath from a calcium wire decoiling machine 17 via the inert gas atmosphere and through the slag. In an analogous manner, aluminum powder may be introduced, e.g., in a manner dispersed in the nitrogen gas stream, the introduction again being effected into the iron bath. Vanadium oxide practically quantitatively dissolves into the iron bath, the remaining residual slag then having the following analysis:

| Component | Portion % |
| --- | --- |
| $SiO_2$ | 34 |
| $Al_2O_3$ | 1.6 |
| $Fe_2O_3$ | — |
| CaO | 46 |
| MgO | 4.3 |
| $SO_3$ | 0.4 |
| $K_2O$ | 0.2 |
| $Na_2O$ | 0.4 |
| $TiO_2$ | 12.5 |
| $Cr_2O_3$ (Cr) | — |
| $Mn_2O_3$ | — |
| $P_2O_5$ | — |
| $V_2O_5$ (V) | — |

Subsequently, this molten slag was rapidly cooled in a conventional manner by means of a water granulator 18 (12 parts by weight of water per part by weight of slag), thereby solidifying into a vitreous product. After drying and grinding this slag constituted a valuable mixed-cement component 19. A hydraulic index according to Keil of 98% (after 28 days) was obtained. In mixed cement up to 80% of clinker may be replaced with this slag.

In FIG. 2 the iron bath in the first reduction stage again is denoted by 9. Through bottom nozzles arranged in a nozzle brick 20 carbon is blown in with inert gas and $Al_2O_3$ and $SiO_2$ are blown in with oxygen. The iron bath reactor 21 is designed as a pivotable converter, $O_2$ and/or air being blown onto the slag 7 through a lance 22 for additional heating. The reduction of the FeO-content of the slag is conducted to 2 to 5 wt. % at temperatures of about 1500° C. such that Cr will remain in the slag.

In FIG. 3 a pivotable reactor is illustrated for the second reduction stage 14. The second reactor 23 again is designed as a pivotable converter, comprising an induction coil 24 for high-frequency heating. The slag still containing residual FeO is further reduced above an Fe bath 25 whose reduction potential is raised by blowing in Al, FeSi, CrC or VC by aid of inert gas, such as, e.g., argon, through the nozzle brick 26, V and Cr thus getting into the bath. The slag 27 free of Cr and V subsequently is drawn off. Additional heating in that case may be effected by means of $H_2$ through plasma burners 28, temperatures of between 1700° and 1800° C. being attained. If desired, the second reduction may be carried out at a reduced pressure, to which end a suction means 29 may be provided.

EXAMPLE 2

From chromium-containing steelworks slag, a cement clinker intermediate product, chromium-free steel as well as synthetic chromium ore are produced by blending with blast furnace slag. The starting slags had the following referential analysis:

| Component | Portion % |
| --- | --- |
| Steel slag analysis | |
| $SiO_2$ | 16 |
| $Al_2O_3$ | 1 |
| CaO | 50 |
| MgO | 3 |
| MnO | 3 |
| $Cr_2O_3$ | 0.5 |
| $Fe_2O_3$ | 15 |
| $(Fe)_{met}$ | 10 |
| Blast furnace slag analysis | |
| $SiO_2$ | 37 |
| $Al_2O_3$ | 13 |
| CaO | 32 |
| MgO | 10 |
| MnO | 2 |
| $TiO_2$ | 1 |
| $K_2O$ | 2 |
| $Na_2O$ | 0.5 |

The two liquid slags are mixed at a ratio of 60% steelworks slag to 40% blast furnace slag. Per ton of slag mixture, 60 kg crude steel sediment out of the steelworks slag.

The mixed slag formed has the following composition:

| Mixed slag analysis | |
| --- | --- |
| Component | Portion % |
| $SiO_2$ | 27 |
| $Al_2O_3$ | 6 |
| CaO | 47 |
| MgO | 3 |
| MnO | 3 |
| $Cr_2O_3$ | 0.4 |
| $Fe_2O_3$ | 10 |
| $TiO_2$ | 0.4 |
| $K_2O$ | 0.8 |
| $Na_2O$ | 0.2 |

This mixed slag was reduced with coke in the reduction furnace at 1400° C. for one hour. In doing so, a final slag having the following composition was formed:

| Final slag analysis | |
| --- | --- |
| Component | Portion % |
| $SiO_2$ | 30 |
| $Al_2O_3$ | 7 |
| CaO | 52 |
| MgO | 3 |

-continued

Final slag analysis

| Component | Portion % |
|---|---|
| $Cr_2O_3$ | 0.03 |
| $TiO_2$ | 0.5 |
| $K_2O$ | 0.9 |
| $Na_2O$ | 0.2 |

This slag was cooled with 3 $Nm^3$ air/kg. A hydraulically active slag as well as a hot gas having a temperature of 650° C. were formed. Per ton of slag, 70 kg pig iron containing 7.5% C as well as 4% Cr were formed. The reduction reactor had been run until the reactor was filled with 15% slag, based on pig iron. The slag flow was stopped and refining took place with 98 kg $O_2$/ton of pig iron. In doing so, chromium was slagged practically completely, the floating 262 kg of slag having the following composition:

Chromium slag analysis

| Component | Portion % |
|---|---|
| $SiO_2$ | 18 |
| $Al_2O_3$ | 5 |
| CaO | 30 |
| MgO | 2 |
| $TiO_2$ | 0.3 |
| $K_2O$ | 0.5 |
| $Na_2O$ | 0.1 |
| $Cr_2O_3$ | 23 |
| $Fe_2O_3$ | 20 |

This chromium slag may be directly supplied to chromium recovery (e.g., ferrochromium). In the second reduction at an accordingly higher reduction potential, metallic chromium or FeCr alloy is obtained.

What is claimed is:

1. A process for the production of least one member selected form the group consisting of hydraulic binders, crude steel, and alloys from basic steel slags containing at least one member selected from chromium and vanadium, said process comprising the steps of:
   mixing said basic steel slag in liquid form with at least one additive selected from the group consisting of blast furnace slag, electric arc furnace slag, dusts from steel production, metallic waste substances, refuse incineration residues, and acid additives for lowering the viscosity and forming a slag mixture,
   affecting sedimentation of crude steel out of the slag mixture;
   reducing the slag mixture that is remaining in a first reduction stage so that an iron oxide content of greater than 1 and less than 5 wt % remains in the slag mixture and removing a metallic iron that is formed,
   further reducing the slag mixture that is remaining, with a reducing agent which has a higher reduction potential as compared to a reducing agent used in said first reduction stage, in a second reduction stage and removing a metallic Cr or a metallic V or ferroalloys thereof that are formed,
   separating a hydraulically active slag; and
   working up the hydraulically active slag to a hydraulic binder.

2. A process according to claim 1, wherein an iron-oxide content of the liquid steel slag in the first reduction stage is maintained larger than 2 wt %.

3. A process according to claim 1, wherein said first reducing step is conducted in a reduction reactor at temperatures of from 1400° C. to 1600° C. for at least 30 minutes.

4. A process according to claim 1, 2, or 3, wherein said mixing step includes mixing the basic steel slag with at least the acid additives, and wherein the acid additives include at least one member selected from the group consisting of $SiO_2$-containing additives and $Al_2O_3$-containing additives.

5. A process according to claim 1, wherein the first reduction stage is performed in the presence of at least one carbon carrier selected from the group consisting of coke, coal and synthesis gas.

6. A process according to claim 1, wherein the first reduction stage is carried out above an iron bath.

7. A process according to claim 6, wherein in the first reduction stage, oxygen is blown (1) through the iron bath onto a slag bath, or (2) onto a slag bath.

8. A process according to claim 1, wherein said second reduction stage comprises adding at least one reducing agent selected from the group consisting of Ca, Al, Si and Fe.

9. A process according to claim 8, wherein said second reduction stage further comprises dosing the at least one reducing agent into an iron bath.

10. A process according to claim 1, wherein the second reduction stage is effected under an atmosphere at least partially rendered inert.

11. A process according to claim 1, further comprising granulating a Cr-free and V-free slag with water and working up the Cr-free and V-free slag to hydraulically active binders or binder additives.

12. A process according to claim 1, wherein in said mixing step, said acid additives are introduced in a preheated state.

13. A process according to claim 1, wherein the first and second reduction stages are performed by electrical heating.

14. A process according to claim 1, wherein said reducing steps are performed in a reduction reactor over an iron bath and comprise adding quartz sand or lime to the slag mixture present in the reduction reactor, and wherein said process further comprises refining a metal bath to steel, wherein said metal bath comprises said iron bath containing reduced metals other than iron from said first reduction step.

15. A process according to claim 1, wherein the liquid steel slag constitutes 50 to 70 wt % of the slag mixture.

16. A process according to claim 1, wherein said reducing steps are performed in a reduction reactor over an iron bath, which is operated until the amount of slag has reached 10 wt % to 20 wt %, based on a metal bath, said metal bath comprising said iron bath containing reduced metals other than iron, whereupon a resulting pig iron is refined to steel; and
   Cr slag, V slag and other alloying elements are produced.

17. A process according to claim 16, further comprising producing a ferrochromium from chromium slag, said chromium slag formed while refining said pig iron.

18. A process according to claim 16, further comprising cooling a refining bath by adding scrap or iron carbide, wherein said refining bath comprises said iron bath.

19. A process according to claim 1, further comprising mixing said liquid steel slag and additives for the slag mixture with one another in the liquid state in a tiltable converter.

20. A process according to claim 10, wherein the atmosphere under which the second reduction stage is effected is free of $N_2$.

21. A method of refining basic steel slag containing chromium and/or vanadium to produce at least one of hydraulic binders, crude steel, and alloys from basic steel slags comprising:

mixing said basic steel slag in liquid form with one or more additives selected from the group consisting of blast furnace slag, electric arc furnace slag, dusts from steel production, metallic waste substances, refuse incineration residues, and acid additives for lowering viscosity and forming a slag mixture;

removing sedimented steel that results from said mixing step as a first product;

reducing said slag mixture in a first reduction stage with a first reducing agent so that an iron oxide content of greater than 1 wt % but less than 5 wt % remains in the slag mixture and removing metallic iron that is formed as a second product;

further reducing said slag mixture, absent said metallic iron, in a second reduction step with a second reducing agent, said second reducing agent in said second reduction step having a higher reduction potential than said first reducing agent, and forming metallic Cr or metallic V or ferroalloys thereof as a third product;

separating a hydraulically active slag; and working up the hydraulically active slag to a hydraulic binder as a fourth product.

22. A process for recovering products from basic steel slag comprising:

mixing basic steel slag in liquid form containing at least one member selected from chromium and vanadium with an additive selected from the group consisting of blast furnace slag, electric arc furnace slag, dusts from steel production, metallic waste substances, refuse incineration residues, and acid additives for lowering viscosity and thereby forming a slag mixture and a sediment of steel;

removing said sediment of steel;

reducing said slag mixture over an iron bath to produce a slag mixture having an iron oxide content of above 1 wt % and below 5 wt % while maintaining said chromium and/or vanadium in said slag mixture and forming a metallic iron;

removing said metallic iron;

reducing said slag mixture further to produce metallic Cr or metallic V or ferroalloys thereof;

removing said metallic Cr or metallic V or ferroalloys thereof; wherein a remaining hydraulic slag is recovered.

23. The process of claim 22, further comprising working up said hydraulic slag to produce hydraulic binders.

24. The process of claim 21, wherein said iron oxide content of the slag mixture in the first reduction stage is maintained to be higher than 2 wt %.

25. The process of claim 1, wherein the second reduction stage is affected under an atmosphere which is enriched with inert gases.

26. A process for the production of at least one member selected form the group consisting of hydraulic binders, crude steel, and alloys from basic steel slags containing at least one member selected from chromium and vanadium, said process comprising the steps of:

mixing a basic steel slag with at least one additive selected from the group consisting of blast furnace slag, electric arc furnace slag, dusts from steel production, metallic waste substances, refuse incineration residues, and acid additives for lowering the viscosity and forming a slag mixture, affecting sedimentation of crude steel out of the slag mixture;

reducing the slag mixture that is remaining in a first reduction stage, with a first reducing agent comprising an iron bath and optionally one or more additives selected from the group consisting of coke, coal and synthesis gas so that an iron oxide content of greater than 1 and less than 5 wt % remains in the slag mixture and removing a metallic iron that is formed, further reducing the slag mixture that is remaining, with a second reducing agent which has a higher reduction potential as compared to said first reducing agent, said second reducing agent being one or more members selected from the group consisting of calcium, aluminum, silicon and iron, in a second reduction stage and removing a metallic Cr or a metallic V or ferroalloys thereof that are formed, separating a hydraulically active slag; and working up the hydraulically active slag to a hydraulic binder.

* * * * *

UNITED STATES PATENT AND TRADEMARK OFFICE
CERTIFICATE OF CORRECTION

PATENT NO.     : 5,882,375
DATED          : March 16, 1999
INVENTOR(S)    : Alfred EDLINGER; Andreas GOESSNITZER It is certified that error appears in the above-identified patent and that said Letters Patent is hereby corrected as shown below:

On the title page:

Please change

Item: "[22] PCT Filed: May 30, 1996"

to

--[22] PCT Filed: April 30, 1996--.

Signed and Sealed this

First Day of February, 2000

Attest:

Attesting Officer

Q. TODD DICKINSON

Acting Commissioner of Patents and Trademarks